Oct. 26, 1943.     A. E. OSBORN     2,333,037
TRANSMISSION GEAR
Filed April 17, 1940     2 Sheets-Sheet 1

INVENTOR.
Alden E. Osborn.

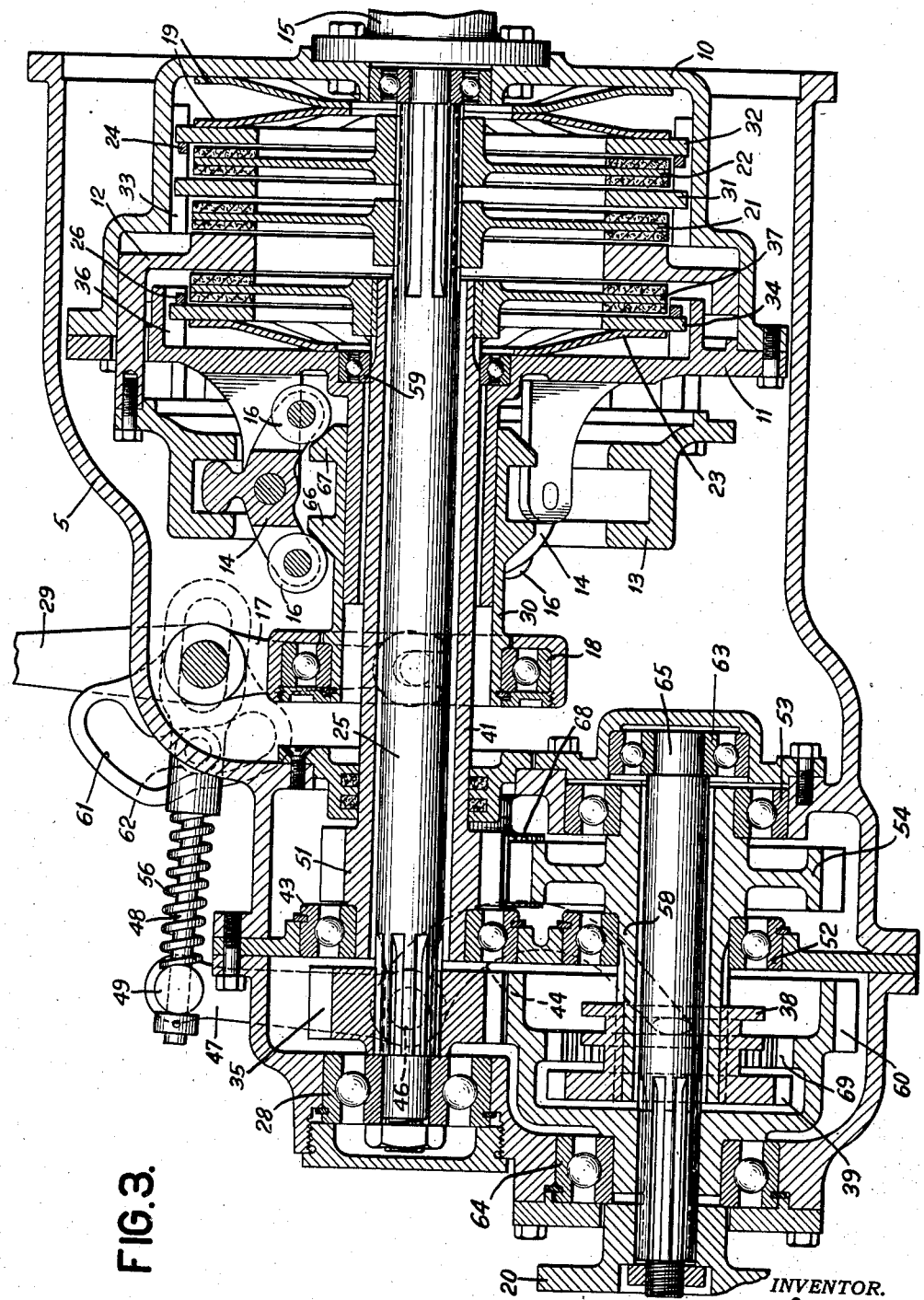

Patented Oct. 26, 1943

2,333,037

UNITED STATES PATENT OFFICE 2,333,037

TRANSMISSION GEAR

Alden E. Osborn, Mount Vernon, N. Y.

Application April 17, 1940, Serial No. 330,096

2 Claims. (Cl. 74—330)

The object of my invention is to provide a transmission or reverse gear in which idle running gears and bearings are eliminated when the gear is operated under ordinary conditions thereby increasing its efficiency and reducing noise and wear. While I have illustrated my invention in direct and indirect gear forms with clutch mechanisms of the disc type, it should be understood that various other gear systems and clutch mechanisms can be used and that other modifications may be made within the scope of the appended claims.

In the drawings:

Figure 3 represents a longitudinal sectional elevation of a reverse gear of the reducing type embodying a modification of the forms of my invention shown in Figure 1.

Figures 1, 2:
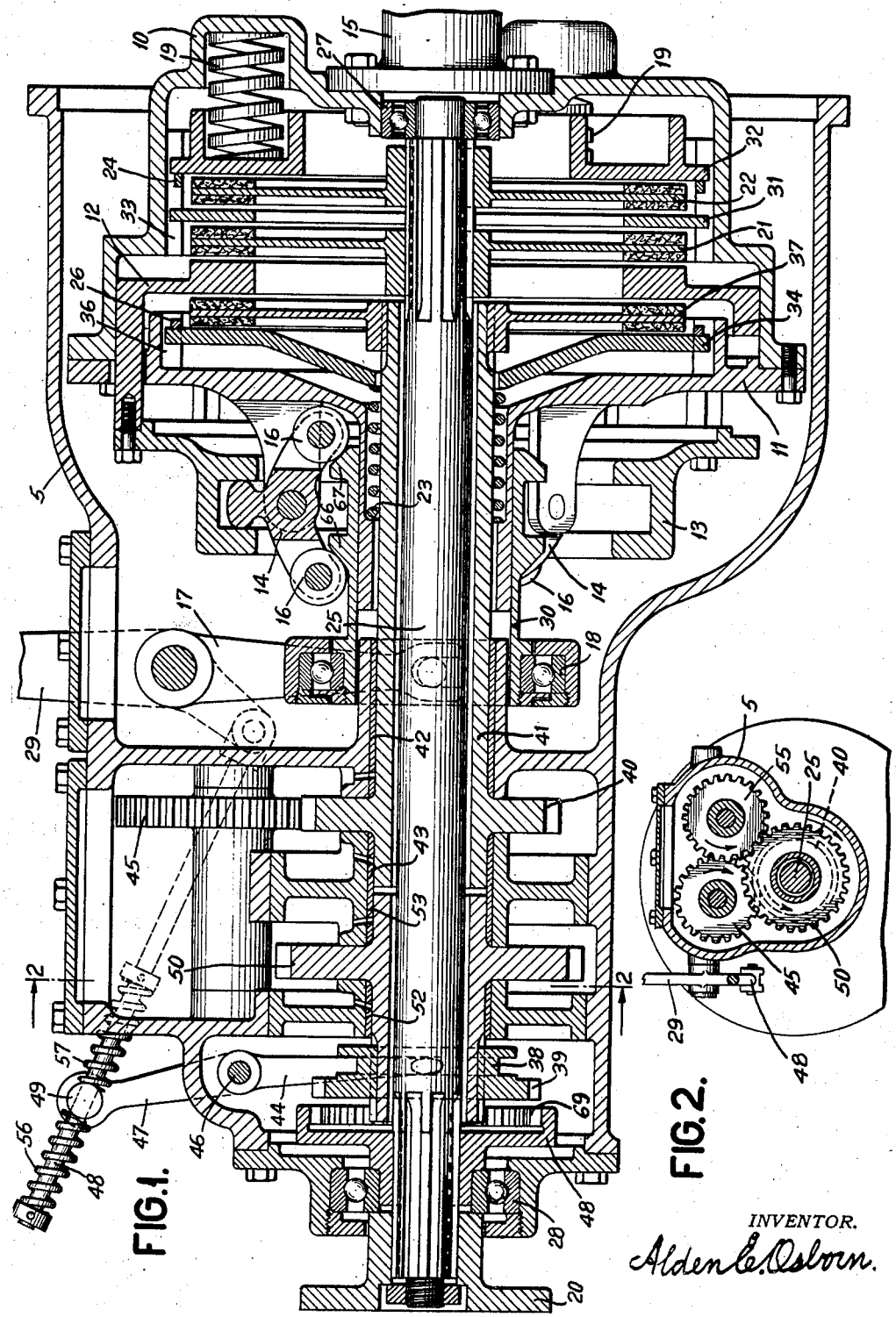
Figure 1 represents a longitudinal sectional elevation of a reverse gear of the direct drive type embodying one form of my invention.
Figure 2 represents, on a reduced scale, a cross-sectional elevation of the gearing of Figure 1 taken on the line 2—2.

In Figure 1, 5 represents the casing of my mechanism, 10 represents the driving element of my mechanism which is bolted to the engine shaft 15, while 20 represents the driven element to be connected to the propeller shaft or other parts to be driven. The driving element 10, which is in the form of a drum or flywheel, encloses a friction clutch mechanism that is shown as comprising two separate disc type friction clutches actuated by a single cam collar 30. One of these clutches consists of the pressure plates 31 and 32 carried by the driving element 10 and rotated therewith by keys 33 and two friction-faced discs 21 and 22 which are mounted on the shaft 25 supported by the bearing 27 in the driving element 10 and a bearing 28 in the casing 5. The other clutch is shown as comprising a pressure plate 34 that is rotated by the element 10 thru keys 36 on the casing cover 11 of the driving element and a single friction-faced disc 37 that is mounted on the splined end of the sleeve 41 of the driving gear 400. The clutch mechanism also embodies a controllable means for exerting pressure either on the clutch discs 21 and 22 or the clutch disc 37 which consists of the longitudinally movable plate 12 that is formed with a plurality of arms extending thru openings in the driving element cover 11 and are fastened to the internally grooved plate 13 on the outside of the cover. The grooved plate 13 and attached parts are given their longitudinal movement by means of levers 14 that are pivoted on the cover 11 and that are provided with rollers 16 that are moved radially by the longitudinal sliding of the collar 30 which in turn is moved to various positions by the lever 17 that connects with the collar's shifting bearing 18, as shown by the dotted lines. The clutch mechanism also comprises wear-compensating springs 19 and 23 back of the pressure plates 32 and 34, these springs being arranged to give as equal pressure as possible thruout the range of their working movement. There is also a split ring 24 snapped in a groove in the keys 33 in the driving element 10, and a split ring 26 snapped in a groove in the keys 36 in the interior of the driving element cover 11, which rings limit the movement of the pressure plates 32 and 34 under the pressure of the springs 19 and 23. The working range of these springs is only sufficient to compensate for wear on the friction surfaces of the clutches and is relatively small. They move only to their full extent when the friction surfaces are unworn, while, as the surfaces wear, the clearance, when the clutches are released, becomes greater and the spring movement becomes less. For example, in the case of the clutch with the two driven friction discs, if the initial clearance in the released position was $\frac{1}{32}$″ per friction surface (four surfaces equals $\frac{1}{8}$″) and the allowance for disc wear was $\frac{1}{16}$″ per surface or a total for the four surfaces of $\frac{1}{4}$″, the movable plate 12 would have a total movement of $\frac{3}{8}$″ and the wear-compensating springs would have a total movement of $\frac{1}{4}$″ with new friction faces. In the case of the clutch with the single driven disc, allowing $\frac{1}{32}$″ clearance and $\frac{1}{16}$″ wear on each friction surface, the movable plate 12 would have a total movement of $\frac{3}{16}$″ and the wear-compensating movement would be $\frac{1}{8}$″. These figures would vary according to the number of clutch discs and the clearance and wear allowance, and are given simply to disclose the principle employed in this method of clutch wear-compensation. While in my drawings one of the clutches is shown with two clutch discs and thus has more friction surfaces than the other clutch, such an arrangement is not essential altho it is preferable in my reverse gear because the reverse clutch is not used as much as the forward drive clutch, and the weight and cost are reduced. If desired, the clutch with the largest number of discs can have somewhat lower pressure wear-compensating springs in order to make its engagement easier.

The gearing employed in this form of my invention comprises the afore-mentioned driving gear 40, the driven gear 50, and the usual intermediate gears 45 and 55, which are shown in Figure 2. The gear 40 meshes with the gear 45 which in turn meshes with the adjacent portion of the gear 55 that extends across the gear box and has a portion also meshing with the driven gear 50. Thus, when the driving gear 40 turns, the intermediate gears 45 and 55 reverse the motion and the driven gear 50 is made to turn in the opposite direction to that in which the gear 40 turns. All these gears are supported on bearings in the casing 5, the gear 40 being supported by the bearings 42 and 43, the driven gear 50 by the bearings 52 and 53, and the intermediate gears by bearings on the shafts mounted in the casing 5 or by bearings in the casing in the usual manner. It will thus be seen that the entire gear system is supported on bearings independently of the rotating parts connected with the driving element 10 or that may be connected to the driving element thru the clutch discs 21 and 22 when the forward drive is engaged. The shaft 25 is thus free to transmit the full power of the engine or driving means to the driven element or flange 20 thru the center of the gear system without any contact therewith and without any friction or power loss on the forward drive. In addition to this complete elimination of bearing friction between the shaft and gear system, I have provided a means whereby the gear system remains stationary during the engagement of the forward drive comprising a clutch mechanism between the driven gear 50 of the gear system and the shaft 25 that is disengaged when the forward drive clutch is engaged by the movement of the control lever 29 that operates the clutch cam collar 30. This clutch, which connects or disconnects the gear 50 to the driven element 20, is shown as of the positive or jaw clutch type, comprising the sliding member 38 with external teeth 69 and the longitudinally stationary member 48 with internal teeth 49 keyed on the shaft 25, altho it may be of the synchromesh, friction or other form. The sliding clutch member may be shifted by a lever 44 fastened to the shaft 46 mounted on supporting bearings in the casing 5 and provided with an operating lever 47 shown as arranged outside the casing at the side thereof. This lever 47 is connected by the rod 48 to an extension of the control lever 29 (as shown by the dotted lines) so that the movement of the control lever 29 is communicated to the rod 48. This rod, however, does not directly communicate its motion to the lever 47, and the parts connected thereto, as springs 56 and 57 are arranged between the rod and lever pin 49 so that when the control lever 29 is moved to engage the forward drive the clutch spring 57 would be compressed with little or no movement being transmitted to the sliding clutch member 38. When the control lever 29 is moved to lock the reverse clutch disc 37 to the driving element 10 the spring 56 would move the lever 47 to slide the clutch member 38 and engage the clutch teeth 39 and 69 unless these teeth happened to be in line, in which case the spring 48 would compress, allowing the continued movement of the control lever 29 and the engagement of the reverse clutch, thus turning the gearing and sliding clutch member 38 and letting the clutch teeth engage. The reverse gear system would thus be locked to the driven element 20 by the backward movement of the control lever 29 beyond its neutral position and would be released from the driven element 20 by a forward movement of the lever to its neutral position—this locking-in or releasing of the reverse gear system occurring before the control lever 29 has moved thru a range sufficient to lock the clutch disc 37 to the driving element 10. The movement of the control lever 29 to its forward position results in locking the clutch discs 21 and 22 to the driving element 10 and the transmission of the rotation of the driving element to the driven element 20 thru the shaft 25 without the reverse gear system moving. Reversing the movement of the control lever 29 towards its backward position results in the release of the forward drive clutch discs 21 and 22 and, after the neutral position has been passed, the meshing of the positive clutch teeth 39 and 69 and after that locking the reverse gear system clutch disc 37 to the driving element 10 and causing the driven element to turn in the opposite direction to the driving element.

In the modified form of my invention shown in Figure 3 a clutch mechanism very similar to that shown in Figure 1 is employed, the only difference being that different forms of wear-compensating springs 19 and 23 are used, altho they function in exactly the same manner as the springs of Figure 1. In this form of my invention these springs are made of a disc formed into a cone shape and the spring pressure is obtained by its resistance to its being flattened. As is usual with this type of spring the disc is cut and perforated so that fingers are formed around its inner or outer edge which bend under pressure, the cuts or perforations being such as to cause it to act with as small a variation in spring pressure as possible thruout the operating range of the spring. The clutches are operated to obtain forward and reverse gear actions by the collar 30, levers 14, etc., in the same way as the clutches in the form of my invention shown in Figure 1. The gear system of this modified form of my invention is somewhat different from the form shown in Figure 1, as it is arranged to drive the driven element 20 at a different speed from the speed at which the driving element 10 turns. In this gear the drive shaft 25 is provided with a pinion 35 which meshes with the gear 60 keyed to the shaft 65 carrying the driving element 20. The driving sleeve 41 is provided with a pinion 51 which meshes with an intermediate gear 68 that in turn meshes with the gear 54 on the sleeve 58 surrounding the shaft 65 and provided with the sliding positive clutch member 38 that has teeth 39 which can be meshed with internal teeth 69 on the gear 60. The intermediate gear is shown in the drawing in Figure 3 as back of the gears 51 and 54 with which it meshes and forms with these other gears the usual arrangement of gearing employed to reverse the rotation of driven parts. The sliding clutch member 38 is, in Figure 3, moved by means of the lever 44, the shaft 46, the external lever 47, the rod 48 and the cam 61 connected to the operating lever 29. The cam which engages the roller 62 on the rod 48 is so shaped that, when the control lever 29 is being moved backward to lock the reverse disc 37 to the driving element 10, the sliding clutch member 38 would be moved to engage the clutch teeth 39 and 69 and lock the reverse gear system to the driven element 20. The drive would then take place thru the gear 51, the intermediate idler gear 68, and the gear 54, the positive clutch teeth 39 and 69 with the forward drive gears 35 and 60 and connected parts revolving idly. When moving the control lever forward to the forward drive position, the reverse gear clutch disc 37 would first be released and the positive clutch teeth 39 and 69 disengaged. After passing thru neutral, the forward drive clutch discs 21 and 22 would be locked to the driven element 10 when the drive would take place thru the gears 35 and 60 with all the reverse gear parts idle. It will be noticed that a spring or flexible element 56 is provided between the rod 48 and lever pin 49 in order to allow the engagement of the reverse drive friction clutch should the clutch teeth 39 and 69 come into end contact. It will also be noticed that bearings of the ball type are shown as supporting the various shafts in place of the plain bearings shown as used in the form of my invention illustrated in Figure 1, as any desirable type of bearing can be employed, and also that a bearing 59 is shown between the end of the sleeve 41 and the driving element cover 11. This bearing is illustrated in order to make clear that, while the supporting of the reverse gear system parts on bearings separate from the forward drive parts is an important feature of my invention, such a slight departure from the complete independent support of the reverse gear parts, as well as various other modifications would still be within the spirit and scope of my invention as defined by the claims.

I claim:

1. In a transmission gear a driving element, a driven element, and a plurality of means for transmitting the rotation of one said element to the other said element, each of said transmitting means comprising a friction clutch adjacent to and connected with said driving element and having a single operating means, and an independent transmitting means, with one of said independent transmitting means embodying a gear connected to one of said friction clutches, an intermediate gear meshing with said first-mentioned gear, a casing for rotatably supporting said gears substantially independently of all the members of the other transmitting means, and a controllable disconnecting means, interconnected thru a flexible element with said clutch operating means, between said driven element and the said gears, whereby both said driving and driven elements and the other friction clutch and transmitting means can revolve independently of frictional contact with said gears and the friction clutch connected thereto, said controllable disconnecting means and said interconnected clutch actuating means being operated by a pivoted manually operated lever adapted to be moved toward one end of its travel, to operate said interconnected means to engage said shaft friction clutch and to disconnect said sleeve gear and said driven element, and to be moved toward the other end of its travel, to operate said interconnecting means to engage said sleeve friction clutch and to render said disconnecting means inoperative.

2. In a transmission gear a driving element, a driven element and a plurality of means for transmitting the rotation of one said element to the other said element, one said transmitting means comprising a shaft, a friction clutch between said shaft and said driving element, to connect or disconnect said shaft and driving element, and a means for transmitting the rotation of said shaft to said driven element and the other said transmitting means comprising a gear system embodying a driving gear having a sleeve surrounding said shaft, a second friction clutch between said sleeve and the driving element, to connect or disconnect said sleeve and said driving element, a casing enclosing said gear system, a supporting bearing in said casing for supporting said sleeve independently of said shaft, gears in said gear system mounted on bearings in said casing with a gear thereof meshing with said sleeve gear and with said gears adapted to transmit the rotation of said sleeve gear to said driven element and turn said element in the opposite direction to the direction of rotation of said element thru the action of said shaft, a disconnecting means whereby said sleeve gear is disconnected from said driven element, and an operating means comprising a pivoted manually operated lever for actuating, thru an elastic element, said disconnecting means, with said lever interconnected with the operating means for said friction clutches whereby, when said lever is moved toward one end of its travel, it operates to actuate said disconnecting means and to engage said shaft friction clutch, and whereby, when said lever is moved toward the other end of its travel, it operates to render said disconnecting means inoperative and to engage said sleeve friction clutch.

ALDEN E. OSBORN.